Nov. 6, 1951  J. D. WILSON ET AL  2,573,780
FILM MAGAZINE
Filed Sept. 14, 1949  7 Sheets-Sheet 1
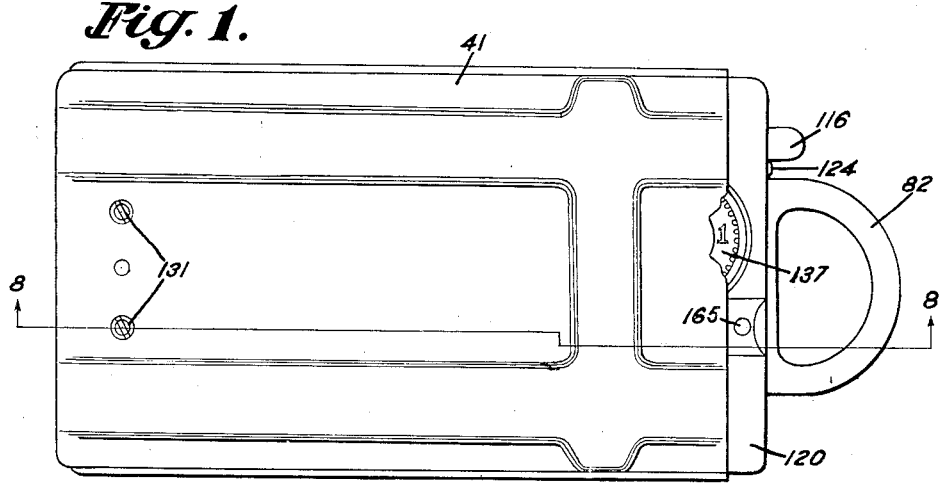
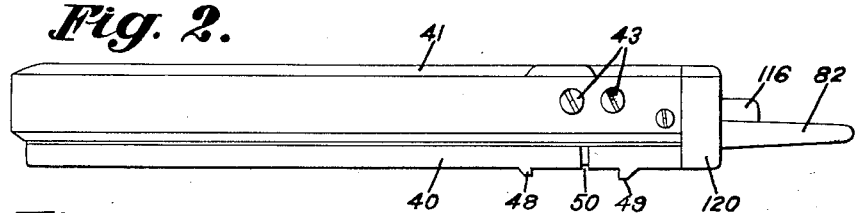
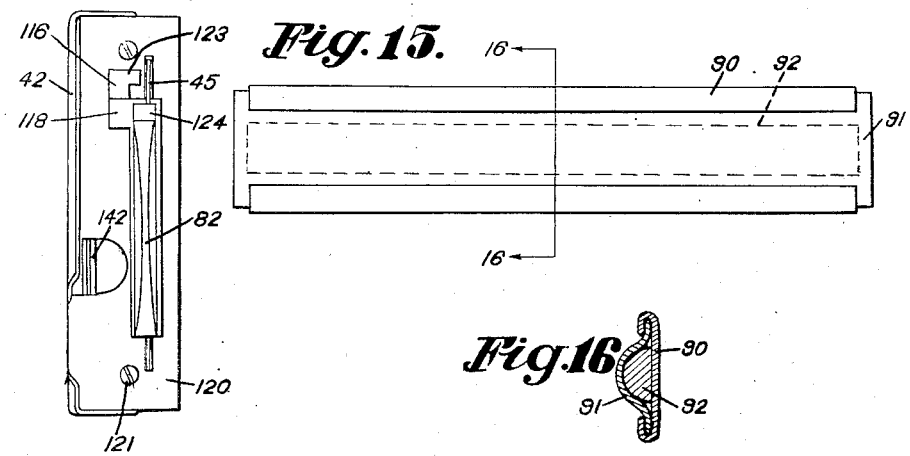
INVENTORS
John D. Wilson
Clarence Elwood Smith
By [signature]
Attorney Nov. 6, 1951  J. D. WILSON ET AL  2,573,780
FILM MAGAZINE
Filed Sept. 14, 1949  7 Sheets-Sheet 2
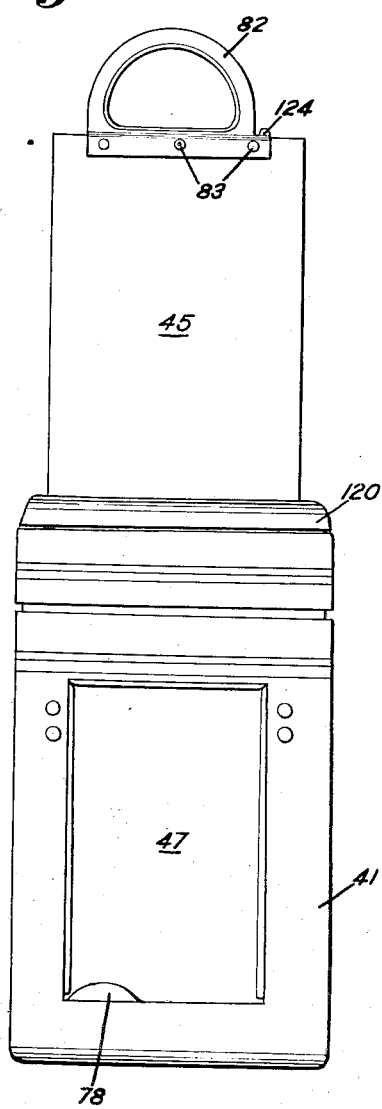
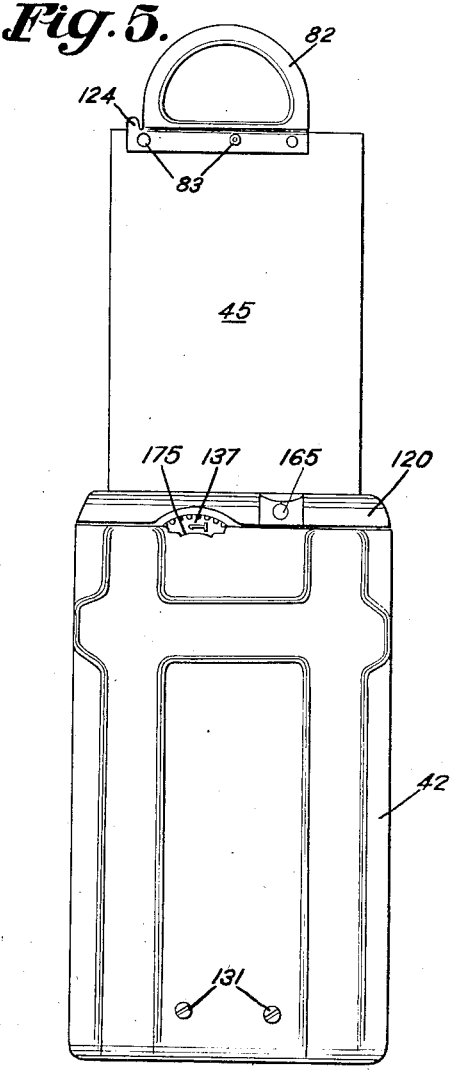
INVENTORS
John D. Wilson
Clarence Elwood Smith
By
Attorney Nov. 6, 1951  J. D. WILSON ET AL  2,573,780
FILM MAGAZINE Filed Sept. 14, 1949  7 Sheets-Sheet 3

INVENTORS
John D. Wilson
Clarence Elwood Smith
By *[signature]*
Attorney

Nov. 6, 1951  J. D. WILSON ET AL  2,573,780
FILM MAGAZINE
Filed Sept. 14, 1949  7 Sheets-Sheet 4
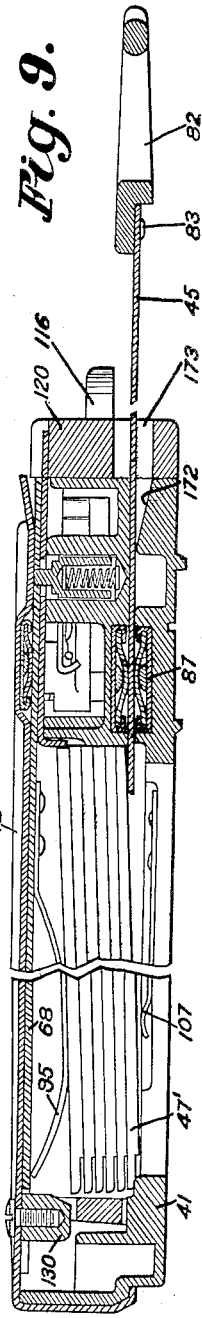
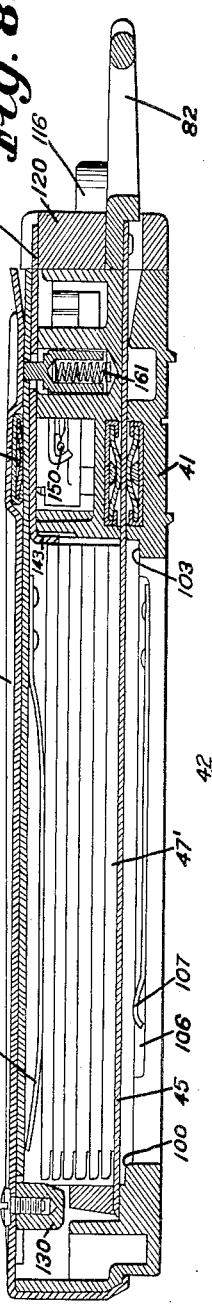
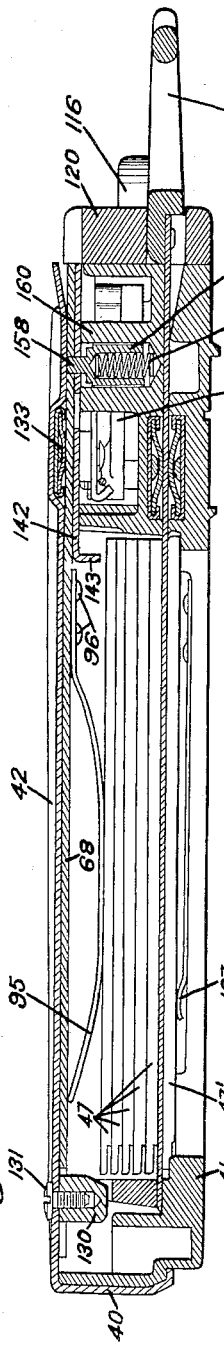
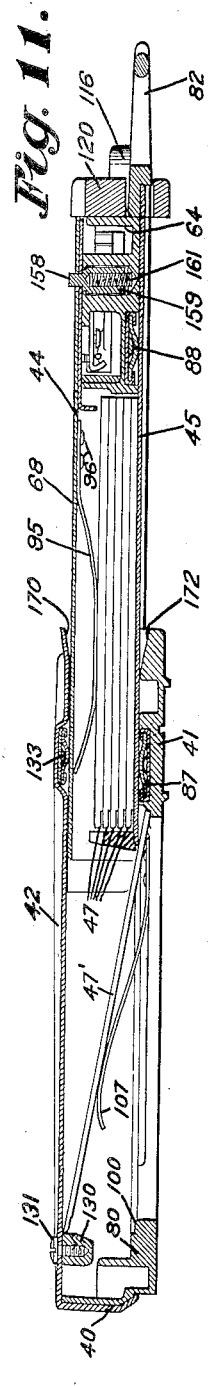
INVENTORS
John D. Wilson
Clarence Elwood Smith
By [signature]
Attorney Nov. 6, 1951   J. D. WILSON ET AL   2,573,780
FILM MAGAZINE
Filed Sept. 14, 1949   7 Sheets-Sheet 5

INVENTORS
John D. Wilson
Clarence Elwood Smith
By
Attorney

Nov. 6, 1951 J. D. WILSON ET AL 2,573,780
FILM MAGAZINE
Filed Sept. 14, 1949 7 Sheets-Sheet 6
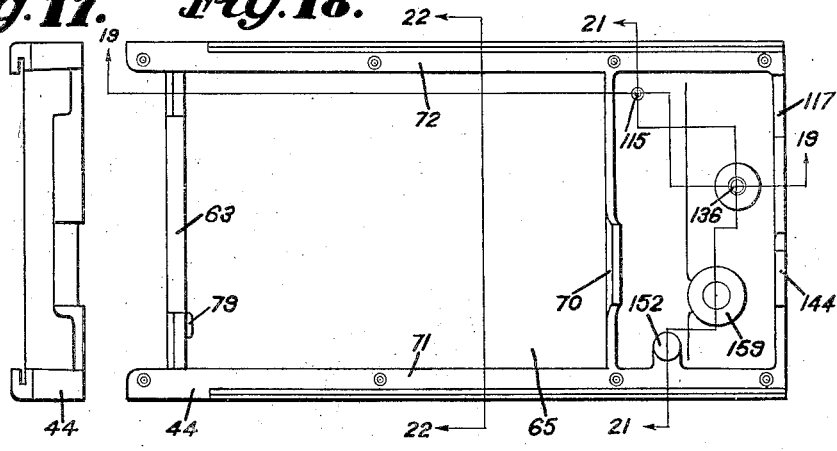
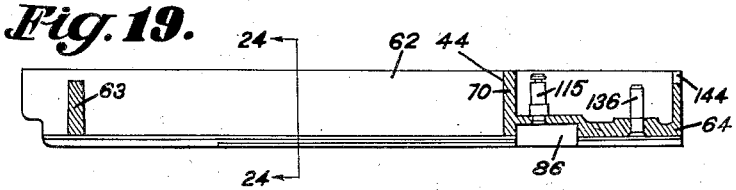
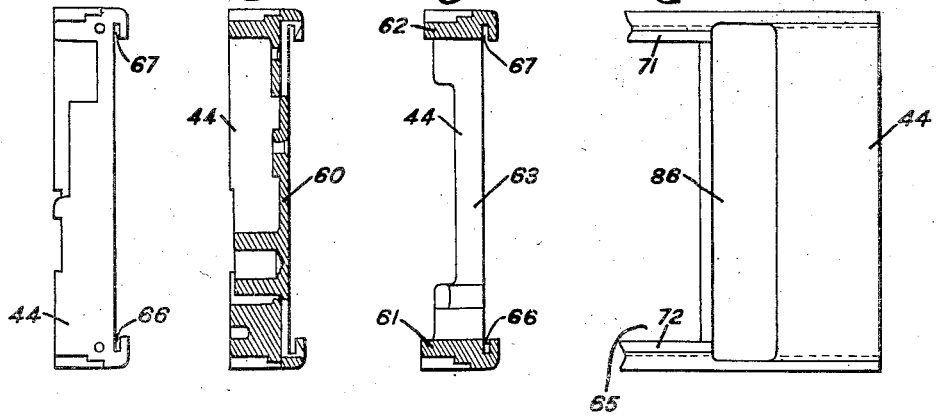
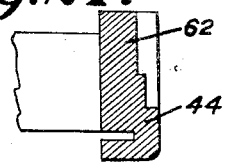
INVENTORS
John D. Wilson
Clarence Elwood Smith
By *[signature]*
Attorney

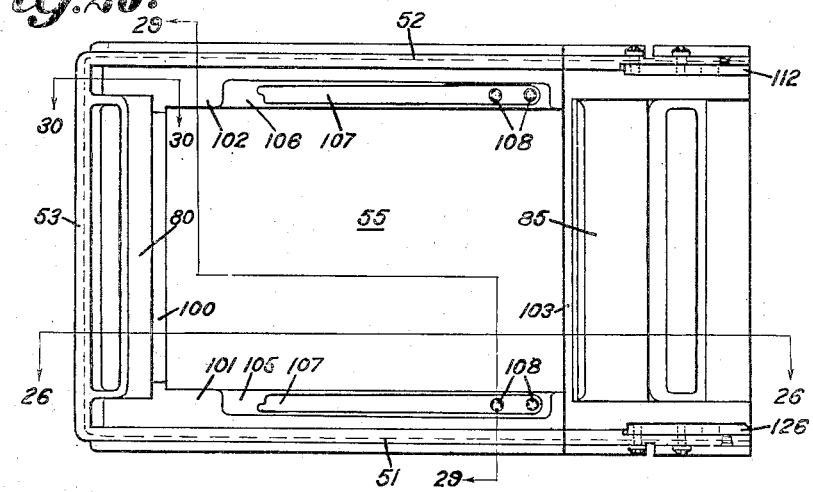
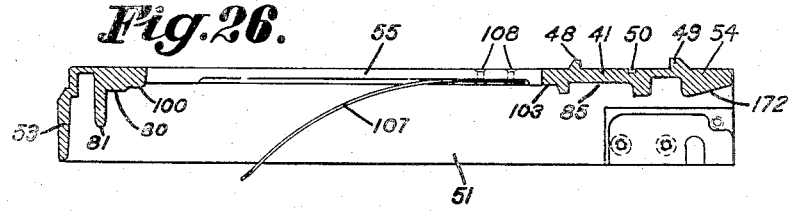
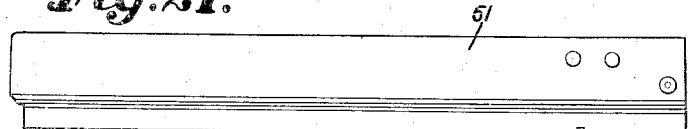
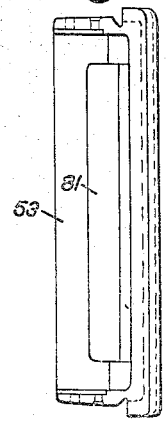
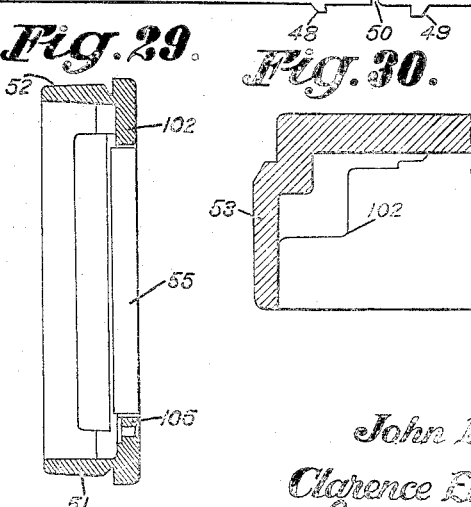

Patented Nov. 6, 1951

2,573,780

UNITED STATES PATENT OFFICE 2,573,780

FILM MAGAZINE

John D. Wilson, New York, and Clarence Elwood Smith, Rochester, N. Y., assignors to Graflex, Inc., Rochester, N. Y., a corporation of Delaware Application September 14, 1949, Serial No. 115,646

18 Claims. (Cl. 95—30)

The present invention relates to photographic cameras and more particularly to sensitized material holders or magazines for such cameras. In a still more specific aspect, the invention relates to a removably magazine for holding cut photographic film.

One object of the present invention is to provide a cut-film magazine for photographic cameras which will hold more cut-film sheets than conventional cut-film holders, and yet occupy approximately no more space than occupied by a conventional cut-film holder.

Another object of the invention is to provide a cut-film magazine which will permit rapid automatic movement of successive cut-film sheets into and out of position for exposure.

Another object of the invention is to provide a cut-film magazine of the character described which will securely protect these sheets against double exposure and against premature exposure.

A further object of the invention is to provide a cut-film magazine having indicating means for showing automatically which one of the several film sheets, that are in the magazine, is in position for exposure and also for showing whether that particular film sheet is covered or uncovered.

Still another object of the invention is to provide a cut-film magazine which will be completely sealed against further possible exposure of the film in the magazine when all of the film has once been exposed.

Still further objects of the invention are to provide a cut-film magazine which will be light-tight, simple in construction, and low in cost.

Other objects of the invention will be apparent hereinafter from the specification and from the recital of the appended claims.

In the drawings:

Fig. 1 is a rear elevation of a cut-film magazine made according to one embodiment of this invention;

Fig. 2 is a side elevation of this magazine;

Fig. 3 is an end elevation of the magazine looking at the right hand end of Figs. 1 and 2;

Fig. 4 is a front view and Fig. 5 is a rear view of the magazine, on a somewhat reduced scale, showing the dark slide withdrawn to permit automatic positioning of a cut-film sheet in the focal plane of the camera for exposure;

Fig. 8 is a section on the line 8—8 of Fig. 1, looking in the direction of the arrows, and showing the magazine loaded and closed prior to an exposure;

Fig. 9 is a corresponding sectional view, showing the dark slide being withdrawn so as to uncover the film sheet, which is at the front of the magazine, and permit this sheet to be positioned automatically in place for exposure;

Fig. 10 is a corresponding sectional view showing the next step in the operation of the magazine, the dark slide having been pushed in again to hold the front film sheet in the focal plane for exposure;

Fig. 11 is a corresponding sectional view showing the next step in operation of the magazine where the dark slide and the drawer are withdrawn together from the casing to permit the exposed film sheet to be moved automatically to the back of the magazine;

Fig. 15 is a detail view showing in elevation one of the light valves which protect the magazine from entrance of light thereinto;

Fig. 16 is a section on the line 16—16 of Fig. 15;

Fig. 17 is an end elevation and Fig. 18 is a side elevation showing the drawer of the magazine with all the other parts removed;

Fig. 19 is a section on the line 19—19 of Fig. 18, looking in the direction of the arrows;

Fig. 20 is a view of the end of the drawer opposite that of Fig. 17;

Fig. 21 is a section on the line 21—21 of Fig. 18, looking in the direction of the arrows;

Fig. 22 is a section on the line 22—22 of Fig. 18, looking in the direction of the arrows;

Fig. 23 is a fragmentary view looking at the bottom of the drawer and at the right hand end thereof, as viewed in Fig. 19;

Fig. 24 is a fragmentary sectional view on the line 24—24 of Fig. 19, looking in the direction of the arrows;

Fig. 25 is a rear view of the front part of the casing of the magazine;

Fig. 26 is a section on the line 26—26 of Fig. 25;

Fig. 27 is a side elevation and Fig. 28 is an end view of this part of the casing;

Fig. 29 is a section on the line 29—29 of Fig. 25; and

Fig. 30 is a fragmentary sectional view on an enlarged scale on the line 30—30 of Fig. 25, looking in the direction of the arrows.

Figure 12:
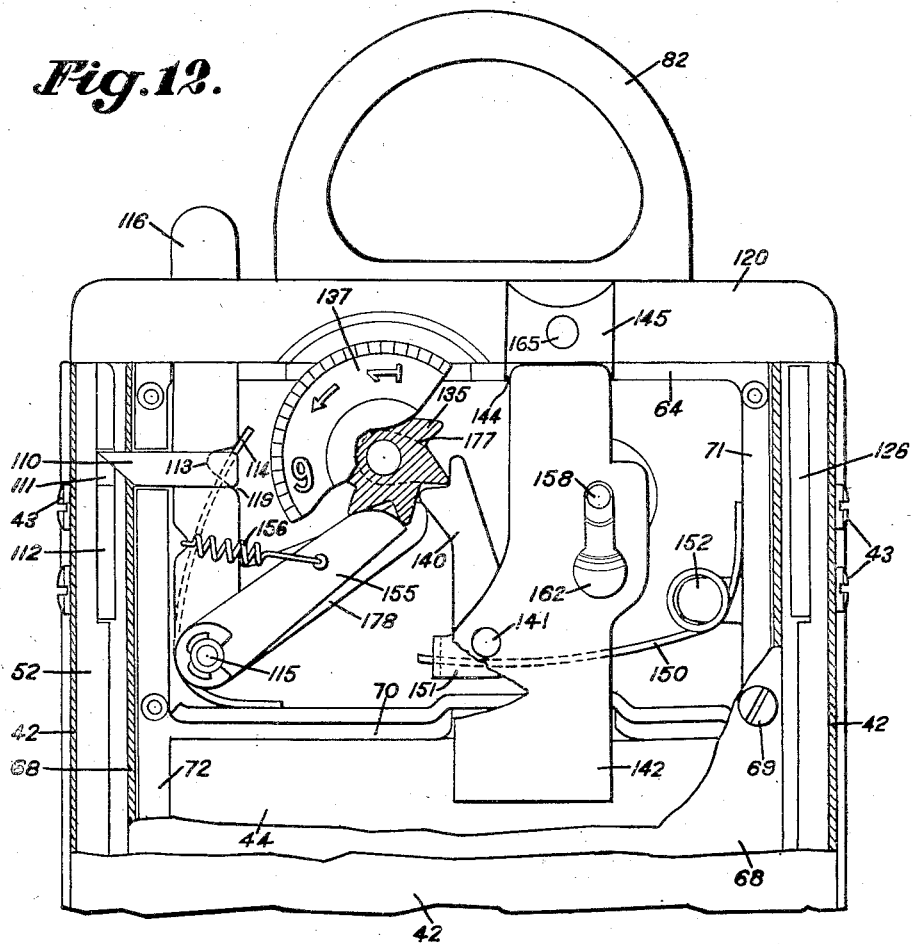
Fig. 12 is a fragmentary view on an enlarged scale, showing parts of the magazine broken away to reveal the counter mechanism, the mechanism for indicating whether the film is uncovered or not, and the mechanism for locking the drawer.

The magazine comprises a casing 40, a drawer 44, and a dark slide 45. The casing comprises a front part 41 and a sheet metal cover 42 which is secured to part 41 by screws 43 (Figs. 2 and 12). The drawer 44 is mounted to slide endwise within the casing; and this drawer is adapted to hold a plurality of film-sheaths or septums 47. In the embodiment of the invention shown the drawer will hold six film sheaths or septums and each sheath carries a cut-film sheet.

The structure of the front part 41 of the casing is shown in detail in Figs. 25 to 30 inclusive. It has a front wall 54, parallel longitudinal side walls 51 and 52 and an end wall 53. It is open at the end opposite to end wall 53. It is provided on the front face of its front wall with ribs 48 and 49 and with a groove 50 (Fig. 26), which are adapted to enter cooperating grooves and ribs on the back of the camera, with which the magazine is used, to provide light-tight connection between the magazine and camera. There is an aperture or opening 55 in front wall 54 through which the sensitized material carried in each of the sheaths or septums may be exposed when the magazine is mounted on the camera.

The drawer 44 is adapted to slide in and out of the casing. It may be made of metal, plastic or other suitable material. It has a bottom 60, side walls 61 and 62, and end walls 63 and 64 (Figs. 17 to 24 inclusive). It has an aperture or opening 65 in its bottom which is adapted to register with the exposure aperture or opening 55 in the casing 40 when the drawer is closed. Opening 65 is larger than opening 55. Opening 65 is made large enough to permit feed of the septums therethrough successively to the exposure aperture 55. The side walls 61 and 62 extend below the bottom 60 of the drawer. These extensions 72 and 71 (Fig. 23) are provided with grooves 66 and 67, respectively, that are adapted to receive and form guide-ways for the dark slide 45. The drawer is covered by a plate 68 (Figs. 8 to 12) that is secured to the side walls of the drawer at the top thereof by screws 69 (Fig. 12).

The drawer has a partition 70 which extends across it from one side to the other. This partition forms with the side walls 61 and 62, the rear wall 63, and the cover 68 a chamber or pocket for the film-sheaths or septums 47.

Figure 14:
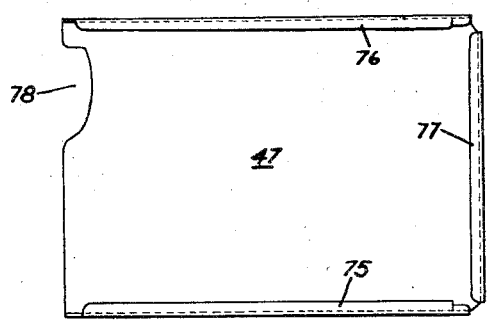
Fig. 14 is an elevational view of one of the cut-film sheaths or septums used in the magazine.

The sheaths or septums 47 may be of conventional construction, as shown in Fig. 14, each being made of a thin sheet of sheet metal whose edges are bent over along three sides, as denoted at 75, 76 and 77, to form a pocket to receive a cut-film sheet. The sheaths or septums 47 are adapted to be loaded into the magazine in a dark room. To insure that each septum is placed in the magazine in the right position so that its film sheet faces the openings 55 and 65, there is a lug 79 (Fig. 18) provided on the rear wall 63 of the drawer 44, and each sheath or septum is notched in one corner, as denoted at 78 in Fig. 14, to receive this lug.

When the dark slide 45 is in closed position, as shown in Fig. 8, it rests at its inner end on a ledge 80 (Figs. 11 and 26) that is formed on a transverse partition wall 81 that projects rearwardly from the part 41 of the casing 40 and extends part way across part 41, as shown in Fig. 25. There is a handle 82 secured to the dark slide 45 by rivets 83; and the dark slide may be moved in and out of the magazine by this hand grip 82. The rear face of the part 41 and the opposed face of the drawer 44 are provided with transversely-extending pockets 85 and 86, respectively (Figs. 25, 26, and 19), in which are mounted light-valves 87 and 88, respectively (Fig. 11). These are adapted to engage opposite sides of the dark slide 45 to prevent leakage of light along the dark slide into the magazine. These light valves may be of conventional construction. One of these valves is shown in Figs. 15 and 16. It comprises a strip of sheet metal 90 whose lateral edges are bent over to provide channels in which is mounted a cloth strip 91 that is backed up by a sponge-rubber pad 92.

There are a pair of leaf springs 95 fastened to the inside of the cover 68 of the drawer 44 by rivets 96 (Figs. 7 to 11). These springs are adapted to press upon the outermost of the septums or sheaths 47, which are in the drawer, to urge the septums forwardly.

The part 41 of the casing is formed with ledges 100, 101, 102, and 103 (Figs. 8, 25 and 26) around the exposure aperture or opening 55. The longitudinal ledges 101 and 102 are recessed as indicated at 105 and 106 and in these recesses are fastened leaf springs 107 by means of rivets 108. The ledge 100 protrudes rearwardly beyond the plane of the rear face of the ledges 101, 102 and 103, the difference being to compensate for the thickness of the turned over portions 75, 76 and 77 of each septum and permit each septum to rest upon the ledges 100, 101, 102 and 103 with the cut-film sheet in the focal plane of the camera.

The drawer 44 is normally held against movement relative to the casing 40 being latched thereto by a latch member 110 (Fig. 12). This latch member is adapted to extend through a slot in one side of the drawer. It engages in a recess 111 provided in a stop plate 112 that is fastened to one side of the part 41 by the same screws 43 that fasten the cover 42 of the casing to the part 41. The latch 110 is constantly urged toward locking position by a torsion spring 114, which engages at one end in a recess of the latch, is coiled around a pivot pin 115, and rests at its opposite end against the partition wall 70 of the drawer. The pivot pin 115 (Figs. 12 and 19) is riveted or otherwise secured in the bottom of the drawer.

Figure 6:
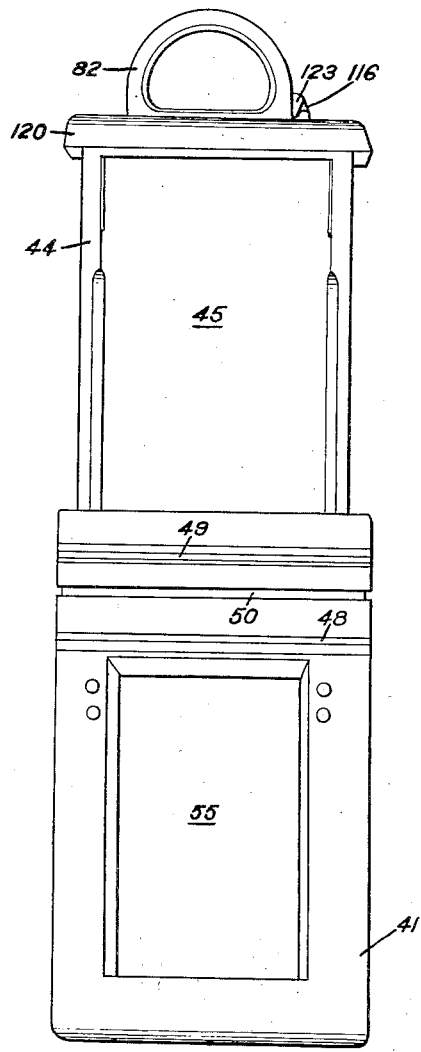
Fig. 6 is a front elevation, similar to Fig. 4, but showing the drawer of the magazine connected to the dark slide so that both have been withdrawn together from the casing.

The latch 110 is adapted to be disengaged by moving the lever 116 to the right from the position shown in Fig. 12. The latch member 110 has a lug 113 formed thereon that engages in a notch 119 of lever 116. This lever is a double-armed lever and is pivotally mounted upon the stud 115. One arm of this lever extends through a slot 118 (Fig. 3) in an end plate 120 which is secured to the end wall 64 of the drawer by screws 121 (Figs. 3, 23, and 8 to 11 inclusive). This arm of the lever has a rounded boss 123 formed on one side of it at its outer end (Figs. 3 and 6). This boss is adapted to engage over a lug 124 (Figs. 1, 3, 4, and 5) provided on the handle 82 of the dark slide 45, when the lever 116 is rocked to the right from the position of Fig. 12, to lock the lever 116 to the handle 82 so that the drawer 44 may be drawn outwardly with the dark slide 45.

The outward movement of the drawer 44 is stopped by the stop plate 112 and a parallel stop plate 126 (Fig. 12) which is fastened to the opposite side of the part 41 of the casing by the screws 43. The stop plates 112 and 126 engage stops 127 formed on opposite sides of the drawer.

The operation of the magazine as so far described will now be explained. Assuming that the magazine has been placed in the camera and there are six film sheaths or septums 47 in the drawer in the position shown in Fig. 8, the first step in using the magazine is to withdraw the dark slide 45 by pulling out on the handle 82, as shown in Fig. 9. This permits the stack of sheaths or septums to be moved forwardly by springs 95, as shown in Fig. 9, which shows the dark slide in partially withdrawn position. Thus the innermost septum 47' is positioned on the ledges 100, 101, 102 and 103 (Figs. 8 and 25) of the part 41 of the casing. The dark slide 45 is then pushed in, firmly locating the septum 47' against these ledges with the film sheet, which is carried thereby, in the focal plane of the camera, as shown in Fig. 10. After this film sheet has been exposed, the latch lever 116 is pressed over against the handle 82 to engage boss 123 (Figs. 3 and 6) over lug 124 of the handle and to disengage the latch 110 (Fig. 12) from the casing. The drawer is then pulled out of the casing by pulling on the handle 82. This permits the springs 107 to move the septum 47' to the back of the magazine as shown in Fig. 11. The drawer 44 is shown only partially open in this figure. A bar 130, which is secured to the cover plate 42 of the casing (Figs. 8 and 11) by screws 131, cooperates with the springs 107 in positioning the septum 47' at the back of the magazine. When the drawer 44 is pushed back into the casing the septum 47' carrying the exposed film sheet is rearmost, riding up onto the stack of septums and under the springs 95 as the drawer is pushed in. The stack of septums, therefore, occupies again the position shown in Fig. 8. Latch 110 is beveled off at one side, as shown in Fig. 12. It cams inwardly over the outer end of stop plate 112 but springs back into locking position when it registers with recess 111 on closure of the drawer. To expose another film, the dark slide is withdrawn as before, as shown in Fig. 9; and then pushed in again, as shown in Fig. 10, positioning the next film sheet in place for exposure. So the operation proceeds till all of the film sheets have been exposed.

A light valve 133, similar in construction to light valves 87 and 88 is mounted in the cover 42 of the casing to engage the cover 68 of the drawer to prevent light leakage along cover plate 68 into the closed drawer.

In a magazine constructed according to the present invention, aside from the means for automatically locating the several film sheets successively in position for exposure and for automatically placing an exposed film sheet at the back of the stack, there are a counter-mechanism for designating which film sheet is at any time in position for exposure, and an indicating device for indicating whether that film sheet is uncovered or not.

The counter-mechanism includes a star or ratchet wheel 135 (Fig. 12) which is rotatably mounted upon a stud 136 (Figs. 18 and 19) that is secured in the bottom of the drawer 44. A graduated indicator dial 137 is secured to the star wheel 135 to rotate therewith. This dial 137 may bear graduations from 1 to 6 corresponding to the number of film sheets carried in the magazine, and between the numerals 1 and 6 the dial may have an arrow or other designating mark, as shown in Fig. 12, the purpose of which will appear hereinafter.

The star wheel 135 is adapted to be actuated by a pawl 140 which is pivotally mounted upon a pin 141 that is secured in an actuating slide 142. The slide 142 is adapted to slide on top of the partition 70 of the drawer and through aligned slots 144 and 145 provided in the end wall 64 and the end plate 120 of the drawer. The slide 142 is constantly urged toward and is normally held in retracted position by a torsion spring 150 which is engaged at one end in a kerf of the tail portion 151 of the pawl 140, is wound around a lug 152 that is formed on the edge 71 of the drawer (Fig. 18) and engages at its other end against this ledge 71. When the septums are in the position shown in Fig. 8, however, the topmost (rearmost) septum engages the downturned inner end 143 of slide 142, forcing the slide to move forwardly as the drawer is moved inwardly.

When the slide 142 is moved forwardly in the drawer 44, the pawl 140 advances the star wheel 135 in a counterclockwise direction to advance the counter dial 137. This occurs once for each cycle of operation of the magazine as will be described further hereinafter. A stop dog 155 (Fig. 12), that is pivotally mounted on the stud 115, serves to prevent accidental rotation of the star wheel in a clockwise direction. This dog is held in operative engagement with the star wheel by a coil spring 156 which is secured to one end to the dog and is fastened at its opposite end in a recess of the lever 116.

The inward, retracting movement of the slide 142 under actuation of the spring 150 is limited by a stop-pin 158. This pin is part of a cylindrical plunger 159 that is mounted in a well 160 (Figs. 8 to 11 and 18) formed integral with the bottom of the drawer. The stop plunger 158 is constantly urged outwardly by a coil spring 161. It passes through a bayonet slot 162 (Fig. 12) formed in the slide 142.

A colored dot 165 (Fig. 12) is provided in the bottom of the slot 145 in the end plate 120. When the slide 142 is in its forward position, it covers this dot, indicating that the film sheet in the foremost septum is covered. When the slide 142 is in its inner, retracted position, the dot 165 is uncovered, indicating that this film sheet is uncovered, ready for exposure.

The operation of the whole magazine will now be described.

To load the film magazine the drawer 44 is opened and the dark slide 45 is withdrawn from the drawer. The dark slide can be withdrawn from the drawer by disengaging the boss 123 (Figs. 3 and 6) of the lever 116 from the lug 124 of the handle 82 after the drawer has been opened. The indicator dial 137 is then set to position 1. The slide 142 is at this time in its forward position covering the dot 165. The stop 158 keeps the slide 142 in this position during loading because with the slide 142 forward, the enlarged portion of the plunger 159 can pass through the enlarged part of the bayonet slot 162. The six sheaths 47 containing the film sheets are then placed in the septum chamber while the magazine is in a dark room. As previously stated the lug 79 (Fig. 18) in the drawer and the notches 78 (Fig. 14) in the septums insure that the septums are positioned correctly in the septum chamber.

After the sheaths or septums have been inserted into the septum chamber of the drawer, the photographer presses them rearwardly by pressing on the foremost septum through aperture 65 in the drawer and the dark slide 45 is pushed in over them. The part 41 of the casing has a sloping surface 172 (Figs. 9 and 26) over which the dark slide 45 rides during its insertion. This guides it in its movement through the slot 173 in the end plate 120 of the drawer.

When the drawer has been loaded, it is closed. In the inward movement of the drawer, the plunger 158 is pushed down by its engagement with the inclined surface 170 of cover portion 42 of the casing. The slide 142 remains, however, in its forward position covering the dot 165, because its downturned portion 143 is in engagement with the rearmost of the septums 47, as indicated in Fig. 8.

The magazine is now light-tight and may be removed from the dark room. The dot 165 is covered indicating that the film in the foremost septum is covered by the dark slide.

After insertion of the magazine into the camera back and prior to taking a picture, the dark slide is pulled out by a handle 82, as previously described, and as shown in Fig. 9. This permits the springs 95 to push the septums forwardly, positioning the foremost septum in the recess in the casing formed by ledges 100, 101, 102 and 103. The dark slide is then pushed in to seat the foremost septum firmly in this recess as already described. Since there are now only five septums to the rear of the dark slide, as shown in Fig. 10, there is no septum to interfere with the slide 142. Hence, the spring 150 returns this slide to its innermost position uncovering the dot 165. This indicates that the film carried by the foremost septum 47' is uncovered ready for picture taking.

Figure 7:
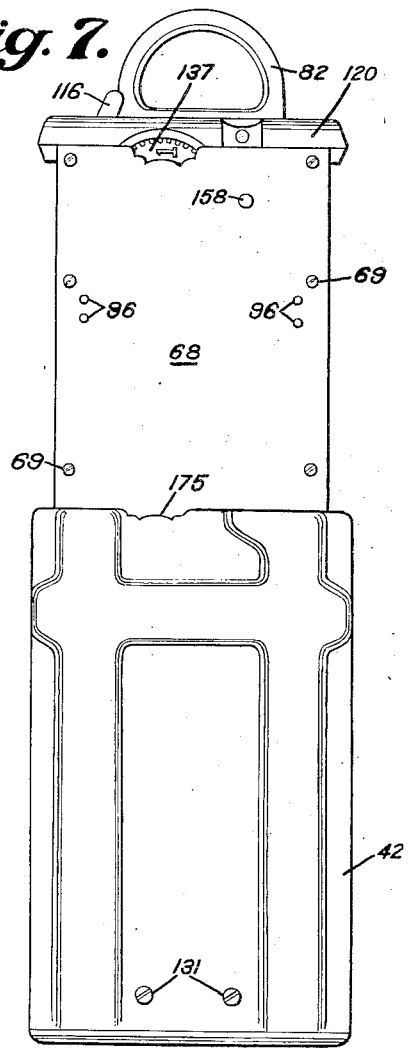
Fig. 7 is a front elevation of the parts when in the positions shown in Fig. 6.

The inward movement of the slide 142 causes the pawl 140 to ride idly over the ratchet wheel 135, assuming the position shown in Fig. 12. The ratchet wheel 135 is prevented from clockwise movement by the dog 155 which serves also to keep the numeral 1 in the viewing aperture 175 (Figs. 5 and 7).

After the film carried by the septum 47' has been exposed, the lever 116 is rocked to the right (Fig. 12) disengaging the latch 110 from the casing, unlocking the drawer, and connecting the drawer to the dark slide 45. The drawer is then pulled open permitting the septum, which carries the exposed film sheet, to be moved to the back of the case as shown in Fig. 11 by the springs 107. The drawer is then closed, causing this septum to re-enter it at the rear of the stack. The septums are therefore again in the position shown in Fig. 8; and, as the drawer is pushed in, the rearmost septum again interferes with the down-turned portion 143 of slide 142, causing the slide 142 to be again pushed out. This causes the pawl 140 (Fig. 12) to rotate the ratchet wheel 135 through one space advancing the counter dial 137 to expose the numeral 2 through the viewing aperture 175. The slide 142 now covers the dot 165 again, indicating that the film in the second septum is covered and the magazine is safe for removal from the camera if desired.

To uncover this second film sheet and move it into the focal plane of the camera, the dark slide 45 is withdrawn as before and as illustrated in Fig. 9. The dark slide is then once more returned to position the film sheet firmly as shown in Fig. 10; and the picture can be taken.

Figure 13:
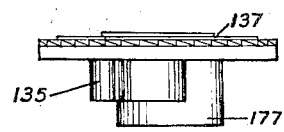
Fig. 13 is a detail view showing the ratchet wheel for advancing the counter and the dog, which is connected thereto, that causes the dark slide to be locked in film-covering position after the last film in the magazine has been exposed.

This cycle is repeated for each picture until the last film has been exposed and returned to the rear of the drawer. When the ratchet wheel 135 is actuated upon closing of the drawer after the last septum has been positioned at the back of the stack of septums, pawl 140, advances the dial 137 to the position indicated by the arrow (Fig. 12). In this position a dog 177 (Figs. 12 and 13) which is integral with the ratchet wheel 135 engages the arm 178 of the lever 116 holding the lever over against the handle 82 with the boss 123 of the lever in engagement with the lug 124 of the handle. This prevents withdrawal of the dark slide without withdrawal of the drawer. Thus double exposure of the film in the first septum 47' is prevented. To unload the septums from the magazine or to re-cycle to expose a film that was left unexposed on first cycling, the dark slide may be unlocked by manually advancing the counter one space.

The magazine of the present invention is compact, and it is light-tight when used in a camera of conventional design. It permits rapid change of film. The dark slide is pulled out and then pushed in; and a film sheet is in position for exposure. The dark slide and drawer together are pulled out and then pushed in; and the septum carrying the exposed film sheet is moved to the back of the stack of septums. At all times the photographer knows whether his film is covered or uncovered; and after each cycle of operation, the counter is advanced so that at all times the photographer knows just how many film sheets have been exposed and how many remain to be exposed. A magazine, such as illustrated, permitting six exposures occupies approximately no more space than would be occupied by a single conventional two sheet film holder. Magazines can be made according to the principles of the invention holding any desired number of septums.

While the invention has been described in connection with a particular embodiment thereof, then, it is to be understood that it is capable of further modification, and this application is intended to cover any variations, uses, or adaptations of the invention following, in general the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. A removable film magazine comprising a casing having an exposure aperture therein at the front thereof, a drawer slidable into and out of the casing and adapted to hold a stack of plates, each of which carries sensitized material, said drawer having an aperture therein at its front large enough to permit feed of the plates successively therethrough to said exposure aperture, a dark slide slidable into and out of said drawer between said two apertures, means for effecting feed of the foremost plate in the stack through said drawer aperture to said exposure aperture when the dark slide is withdrawn, means operable, when both the dark slide and the drawer are withdrawn, for moving the plate, which is at the exposure aperture, to the rear of the casing, a reciprocable signal, means adapted to be engaged by the last plate in the stack, when all the plates are in the drawer behind the dark slide, for moving said signal in one direction, and means for constantly urging the signal in the opposite direction.

2. A removable film magazine comprising a casing having an exposure aperture therein at its front, a drawer slidable into and out of the casing and adapted to hold a stack of plates, each of which carries sensitized material, said drawer having an aperture therein at its front large enough to permit feed of the plates therethrough to said exposure aperture, a dark slide slidable into and out of the casing between the two apertures independently of said drawer, means for detachably connecting the dark slide to the drawer so that they may be both moved together, means for feeding the foremost plate in the stack to the exposure aperture on outward movement of the dark slide independently of said drawer, means operable upon opening of said drawer to move the plate, which is at the exposure aperture, to the rear of the casing, indicating means, and means operable by the rearmost plate in the stack, when the drawer is closed after return of a plate from the exposure opening to the rear of the stack, for advancing said indicating means step-by-step to indicate progressively the number in order of positioning for exposure of the plate which is at that time foremost in the stack.

3. A film magazine comprising a casing having an exposure aperture therein, a drawer slidable into and out of said casing and adapted to hold a plurality of plates in a stack, each of said plates carrying sensitized material, said drawer having an aperture therein through which the plates may be fed to the exposure aperture, a dark slide slidable into and out of the casing between said apertures, means for feeding a plate to the exposure aperture each time the dark slide is withdrawn, means for moving the plate, which is at the exposure aperture to the back of the stack when the drawer is opened and closed, a counter mechanism, a reciprocable signal for indicating whether a plate is at the exposure aperture or not, and means actuated on opening and closing of the drawer for advancing said counter mechanism and actuating said signal.

4. A film magazine comprising a casing having an exposure aperture therein, a drawer slidable into and out of said casing and adapted to hold a plurality of plates in a stack, each of said plates carrying sensitized material, said drawer having an aperture therein through which the plates may be fed to the exposure aperture, a dark slide slidable into and out of the casing between said apertures independently of said drawer, means for feeding a plate to the exposure aperture each time the dark slide is withdrawn independently of said drawer, means for detachably connecting said dark slide to said drawer so that both may be withdrawn from the casing together, means for moving the plate, which is at the exposure aperture, to the back of the stack when the drawer is opened and closed with the dark slide connected thereto, a counter, and means actuated upon opening and closing of said drawer, when the dark slide is connected to said drawer, for actuating said counter.

5. A film magazine comprising a casing having an exposure aperture therein, a drawer slidable into and out of said casing and adapted to hold a plurality of plates in a stack, each of said plates carrying sensitized material, said drawer having an aperture therein through which the plates may be fed to the exposure aperture, a dark slide slidable into and out of the casing between said apertures independently of said drawer, means for feeding a plate to the exposure aperture each time the dark slide is withdrawn independently of said drawer, means for detachably connecting said dark slide to said drawer so that they may both move together, means for moving the plate which is at the exposure aperture, to the back of the stack when the drawer is opened and closed with said dark slide connected thereto, means for indicating whether a plate is at the exposure aperture or not, a counter, and means movably mounted in said drawer and operable by the plates that are behind the dark slide for controlling said indicating means and operating said counter.

6. A film magazine comprising a casing having an exposure aperture therein, a drawer slidable into and out of said casing and adapted to hold a plurality of plates in a stack, each of said plates carrying sensitized material, said drawer having an aperture therein through which the plates may be fed to the exposure aperture, a dark slide slidable into and out of the casing between said apertures independently of said drawer, means for detachably connecting said dark slide to said drawer so that both may move together, means for feeding a plate to the exposure aperture each time the dark slide is withdrawn independently of said drawer, means for moving the plate, which is at the exposure aperture to the back of the stack when the drawer with the dark slide connected thereto is opened and closed, a locking member and a member advanced step-by-step, upon each cycle of opening and closing the drawer, with the dark slide connected thereto for actuating said locking member into locking position to lock the dark slide to the drawer after all of the plates have been advanced to the exposure opening and returned to the back of the stack.

7. A film magazine comprising a casing having an exposure aperture therein, a drawer slidable into and out of said casing and adapted to hold a plurality of plates in a stack, each of said plates carrying sensitized material, said drawer having an aperture therein through which the plates may be fed to the exposure aperture, a dark slide slidable into and out of the casing between said apertures independently of said drawer, means for detachably connecting said dark slide to said drawer so that both may move together, means for feeding a plate to the exposure aperture each time the dark slide is withdrawn independently of said drawer, means for moving the plate, which is at the exposure aperture, to the back of the stack when the drawer with the dark slide connected thereto is opened and closed, a counter, mechanism for advancing said counter step-by-step, comprising a ratchet wheel connected to the counter, a pawl engaging said ratchet wheel, and means for actuating said pawl comprising a slide reciprocable in said drawer and on which the pawl is mounted, said last-named slide having a portion which is positioned to engage the rearmost plate in the stack, when the drawer is closed after return of a plate to the back of the stack, to effect movement of said slide and pawl.

8. A film magazine comprising a casing having an exposure aperture therein, a drawer slidable into and out of said casing and adapted to hold a plurality of plates in a stack, each of said plates carrying sensitized material, said drawer having an aperture therein through which the plates may be fed to the exposure aperture, a dark slide slidable into and out of the casing between said apertures independently of said drawer, means for detachably connecting said dark slide to said drawer so that both may move together, means for feeding a plate to the exposure aperture each time the dark slide is withdrawn independently of said drawer, means for moving the plate, which is at the exposure aperture, to the back of the stack when the drawer is opened and closed with said dark slide connected thereto, an indicia on the casing, a counter journalled in the drawer, a slide reciprocable in the drawer, a pawl carried by the last-named slide, a ratchet wheel secured to said counter, and said last-named slide having a portion adapted to engage the rearmost plate in the stack to move said last-named slide in a direction to cover said indicia and to cause the pawl to advance the ratchet wheel, when the drawer is closed after return of a plate to the back of the stack, and means for constantly urging the slide in the opposite direction.

9. A removable film magazine comprising a casing having an exposure aperture therein, a drawer which is slidable into and out of said casing and which is adapted to hold a stack of plates, each of which is adapted to carry sensitized material, said drawer having an aperture therein large enough to permit feed of the plates therethrough to said exposure aperture, a dark slide slidable into and out of the casing between the two apertures, means for releasably locking the drawer to the casing, and a manually operable member for disengaging said locking means and simultaneously connecting the dark slide to the drawer so that they may both be moved together, means pressing on the rearmost plate of the stack to feed the plates forward toward the exposure aperture on outward movement of the dark slide, and means for pressing the plate, which is at the exposure aperture, to the rear of the casing when both the dark slide and the drawer are withdrawn from the casing.

10. A removable film magazine comprising a casing having an exposure aperture therein, a drawer which is slidable into and out of said casing and which is adapted to hold a stack of plates, each of which is adapted to carry sensitized material, said drawer having an aperture therein large enough to permit feed of the plates therethrough to said exposure aperture, a dark slide slidable into and out of the casing between the two apertures, a latch pivotally mounted in the drawer for releasably locking the drawer to the casing, means constantly urging the latch into locking position, a manually-operable member for moving the latch to released position, means carried by said last-named member for engaging said dark slide, upon movement of the latch to released position, to lock said dark slide to said drawer, means pressing on the rearmost plate of the stack to feed the plates forward toward the exposure aperture on outward movement of the dark slide, and means for pressing the plate, which is at the exposure aperture, to the rear of the casing when both the dark slide and the drawer are withdrawn from the casing.

11. A removable film magazine comprising a casing having an exposure aperture therein, a drawer which is slidable into and out of said casing and which is adapted to hold a stack of plates, each of which is adapted to carry sensitized material, said drawer having an aperture therein large enough to permit feed of the plates therethrough to said exposure aperture, a dark slide slidable into and out of the casing between the two apertures, a lever pivotally mounted in the drawer, a latch secured to said lever for locking the drawer to the casing, a spring connected to the lever and constantly urging the latch toward locking position, said lever being rockable manually about its pivot to release said latch, and interengageable parts on the lever and dark slide adapted to be engaged, on movement of the lever to latch-releasing position, to lock the dark slide to the drawer, means pressing on the rearmost plate of the stack to feed the plates forward toward the exposure aperture on outward movement of the dark slide, and means for pressing the plate, which is at the exposure aperture, to the rear of the casing when both the dark slide and the drawer are withdrawn from the casing.

12. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures independently of said drawer, means for detachably connecting said dark slide to said drawer, so that they may both move together, means for feeding the foremost plate in the stack to the exposure aperture each time the dark slide is withdrawn independently of said drawer, means for moving the plate, which is at the exposure aperture, to the back of the stack when the drawer is opened and closed with said dark slide connected thereto, a counter, a counter-actuating slide reciprocable in said drawer and operatively connected to said counter to advance said counter a step each time the counter-actuating slide is moved in one direction, a member connected to said counter-actuating slide and positioned to be engaged by the rearmost plate in the stack and to be moved thereby to move said slide in the counter-advancing direction each time the drawer is closed after return of a plate to the back of the stack, and means for moving said last-named member in the opposite direction when a plate is moved to the exposure aperture.

13. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures, means for feeding the foremost plate in the stack to the exposure aperture each time the dark slide is withdrawn, means for moving the plate, which is at the exposure aperture, to the back of the stack when the drawer is opened and closed, means for releasably locking the drawer to the casing, a manually-movable member for disengaging said locking means and simultaneously connecting the dark slide to the drawer so that they may both be moved together, and means advanceable step-by-step, on opening and closing of the drawer, and operable, after all the plates have been advanced to the exposure aperture and returned successively to the back of the stack, to move said manually-operable member automatically to position to lock the dark slide to said drawer.

14. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures, means for feeding the foremost plate in the stack to the exposure aperture each time the dark slide is withdrawn, means for moving the plate, which is at the exposure aperture, to the back of the stack when the drawer is opened and closed, a latch pivotally mounted in the drawer for releasably locking the drawer to the casing, means constantly urging the latch into locking position, a manually-operable member for moving the latch to released position, means carried by said last-named member for engaging the dark slide, upon movement of the latch to released position, to lock said dark slide to said drawer, a cam movable to a position to force said last-named member into position to engage the dark slide, and a ratchet and pawl mechanism for advancing said cam step-by-step toward its operative position, on opening and closing said drawer.

15. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures independently of said drawer, means for detachably connecting said dark slide to said drawer so that they may both move together, means for feeding the foremost plate in the stack to the exposure aperture each time the dark slide is withdrawn independently of said drawer, means for moving the plate, which is at the exposure aperture, to the back of the stack when the drawer is opened and closed with said dark slide connected thereto, means for locking the dark slide to the drawer, and a member advanceable step-by-step to a position in which it moves the locking means to locking position, said member being positioned to be engaged by the rearmost plate in the stack and to be moved thereby a step each time the drawer is closed after return of a plate to the back of the stack.

16. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures, means for feeding the foremost plate in the stack to the exposure aperture each time the dark slide is withdrawn, means for moving the plate, which is at the exposure aperture, to the back of the stack when the drawer is opened and closed, means for locking the dark slide to the drawer, a member reciprocable in the drawer, said member being positioned to be engaged by the rearmost plate in the stack and to be moved thereby in one direction each time the drawer is closed after a return of a plate to the back of the stack, means for moving said last-named member in the opposite direction, a pawl secured to said reciprocable member, a ratchet wheel engaged by said pawl, and a cam connected to the ratchet wheel and operable upon movement to a predetermined position to move said locking means to locking position.

17. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures independently of said drawer, means for detachably connecting said dark slide to said drawer so that both may move together, means for feeding the foremost plate in the stack to the exposure aperture each time the dark slide is withdrawn independently of said drawer, means for moving the plate, which is at the exposure aperture, to the back of the stack when the drawer is opened and closed with said dark slide connected thereto, means for locking the dark slide to the drawer, an indicia on the casing, a counter journaled in the drawer, a member reciprocable in the drawer, said member being positioned to be engaged by the rearmost plate in the stack and to be moved thereby in one direction each time the drawer is closed after return of a plate to the back of the stack, means for moving said reciprocable member in the opposite direction, said reciprocable member covering said indicia on movement in one direction, a pawl secured to said reciprocable member, a ratchet wheel engaged by said pawl and connected to said counter, and a cam connected to the ratchet wheel to be advanced thereby to a position to move said locking means to locking position.

18. A film magazine comprising a casing having an exposure aperture therein at the front thereof, a drawer slidable into and out of said casing and adapted to hold a plurality of plates in a stack, each of said plates being adapted to carry sensitized material, said drawer having an aperture at its front through which the plates may be fed successively to the exposure aperture, a dark slide slidable into and out of the casing between said apertures, means for feeding the foremost plate in the stack to the exposure aperture each time the dark slide is withdrawn, means for moving the plate, which is at the exposure aperture, to the back of the stack when the drawer is opened and closed, a latch movably mounted in the drawer for releasably locking the drawer to the casing, means constantly urging the latch into locking position, a lever pivotally mounted in the drawer for moving the latch to released position, means carried by said lever for engaging said dark slide, upon movement of the latch to released position, to lock said dark slide to the drawer, an indicia in the casing, a counter journaled in the drawer, a member reciprocable in the drawer, said member being positioned to be engaged by the rearmost plate in the stack and to be moved thereby in one direction each time the drawer is closed after return of a plate to the back of the stack, means for moving said reciprocable member in the opposite direction, said reciprocable member covering said indicia on movement in one direction, a pawl secured to said reciprocable member, a ratchet wheel engaged by said pawl and connected to said counter, said lever being manually movable from latch-releasing to dark-slide locking position and back, and means for moving said lever automatically from latch-releasing to dark-slide locking position comprising a cam connected to the ratchet wheel to be advanced thereby step-by-step to a position to move said lever to disengage the latch and to lock the dark slide to the drawer.

JOHN D. WILSON.
CLARENCE ELWOOD SMITH.

REFERENCES CITED

The following references are of record in the file of this patent:

UNITED STATES PATENTS

| Number | Name | Date |
| --- | --- | --- |
| 1,469,273 | Kauser | Oct. 2, 1923 |
| 1,557,085 | Piller | Oct. 13, 1925 |
| 1,613,378 | Boniforti | Jan. 4, 1927 |
| 2,086,930 | Hollenben | July 13, 1937 |

FOREIGN PATENTS

| Number | Country | Date |
| --- | --- | --- |
| 81,768 | Germany | June 26, 1895 |
| 422,642 | Germany | Dec. 9, 1925 |
| 431,291 | Germany | July 8, 1926 |
| 445,546 | Germany | June 14, 1927 |